Sept. 17, 1963  J. C. WHITING  3,103,952
VISIBLE FILTER CLOGGING INDICATOR
Filed March 28, 1960
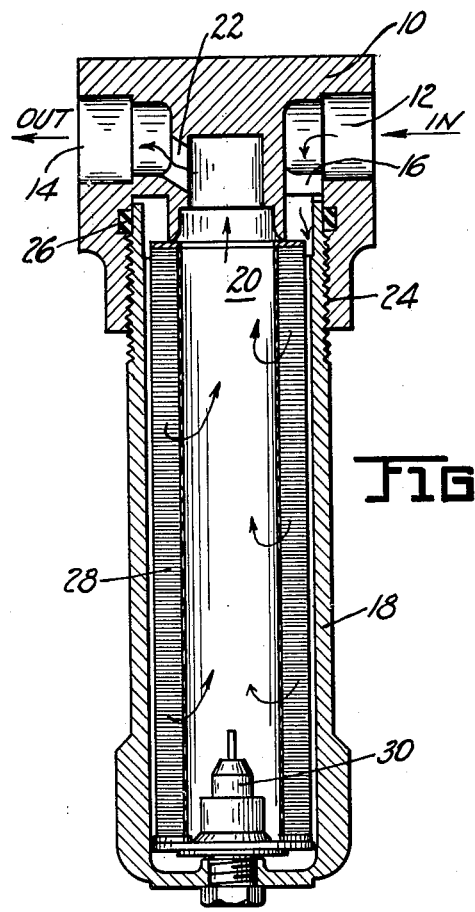
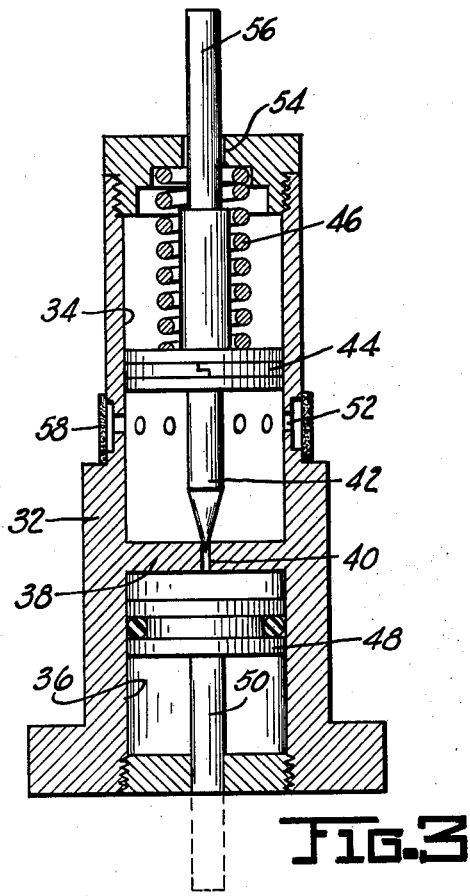
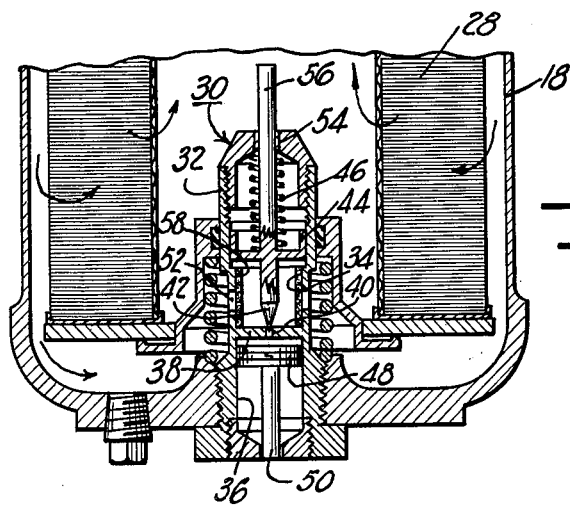
INVENTOR.
JAMES C. WHITING
BY
William N. Antonie
ATTORNEY

United States Patent Office 3,103,952
Patented Sept. 17, 1963

3,103,952
VISIBLE FILTER CLOGGING INDICATOR
James Clifford Whiting, Madison Heights, Mich., assignor to The Bendix Corporation, a corporation of Delaware
Filed Mar. 28, 1960, Ser. No. 17,843
1 Claim. (Cl. 137—557)

This invention relates to a visible filter clogging indicator and more particularly to a differential pressure indicator for use with a filter which will provide a warning signal when the differential pressure across the filter element exceeds a predetermined value.

One of the objects of this invention is to provide a differential pressure indicator which will continue to indicate the clogged condition of the filter even after the apparatus with which the filter is associated has ceased to operate.

More specifically, it is an object of this invention to provide a differential pressure indicator which is tamper proof in that the indicator pin cannot be reset from a signalling to a non-signalling position without removing the filter bowl and contaminated filter element.

Another object of this invention is to provide a differential pressure indicator which is suitable for low pressure systems.

A further object of this invention is to provide a differential pressure indicator which substantially reduces friction problems.

A still further object of this invention is to provide a differential pressure indicating device which may be easily and inexpensively fabricated.

The above and other objects and features of the invention will become apparent from the following description of the device taken in connection with the accompanying drawing which forms a part of this specification and in which:

FIGURE 1 is a sectional view of a filter unit incorporating my visible filter clogging indicator;

FIGURE 2 is an enlarged sectional view of my filter clogging indicator shown in conjunction with a portion of the filter unit; and FIGURE 3 is an enlarged schematic view of my indicator showing the essential parts thereof.

Referring to FIGURES 1 and 2, numeral 10 indicates a filter head having an inlet port 12 and an outlet port 14 which communicate with each other via passage 16, fluid bowl 18, and passages 20 and 22 respectively. The bowl is secured in place to the lower side of head 10 by screw threads 24 and is sealed thereto in fluid tight relationship by an O-ring gasket 26 in an annular groove. A suitable filter element 28 is disposed in the fluid bowl in such a manner that fluid flowing between the inlet port 12 and the outlet port 14 will flow therethrough, as indicated by the arrows. Brackets (not shown) may be provided for mounting the device on an engine or other mechanism.

Located within filter element 28 is a differential pressure indicator assembly 30 which is threaded into the end of fluid bowl 18. The indicator assembly includes a housing 32 having a first bore 34 and a second bore 36 therein, said bores being separated by a partition 38. An orifice 40, which is located in partition 38, permits flow of fluid from one side of the partition to the other under certain conditions. Located within bore 34 is a needle valve member 42 extending from a differential piston 44, said valve member normally being seated in orifice 40 as a result of the force exerted by spring 46. When the valve member is in this seated position there is effectively no flow through the orifice. Located in bore 36 is an indicator piston 48 having an indicator pin 50 extending therefrom, said indicator pin being movable from a hidden first position (non-signalling position) to a visible second position (signalling position), as shown in FIGURE 3. Filter inlet pressure is communicated to one side of differential piston 44 via ports 52, while filter outlet pressure is communicated to the other side of differential piston 44 by port 54. Extending from differential piston 44 and passing through port 54 is a rod 56 which is used to manually unseat valve member 42 and thus permit flow through orifice 40.

Operation of the indicator is as follows: Flow through the filtering device, as indicated by the arrows in FIGURES 1 and 2, is from inlet port 12, through filter element 28 and out through outlet port 14. Filter inlet pressure is communicated to the lower side of differential piston 44 via port 52, while filter outlet pressure is communicated to the upper side of the differential piston via port 54. When the filtering device starts to get clogged, the increased pressure drop across the filter element 28 will be such that the force created by the filter inlet and outlet pressures acting on differential piston 44 will exceed the force exerted by spring 46, thereby causing the piston to move in an upward direction. Thus, at a given differential in filter inlet and outlet pressures, said differential being determined by the spring load of spring 46, needle valve 42 will be unseated from orifice 40 thereby permitting fluid flow therethrough and communication of indicator piston 48 with filter inlet pressure. With filter inlet pressure acting on one side of indicator piston 48 and atmospheric pressure acting on the other side thereof indicator pin 50 will be moved to a visible position outside of housing 32, thereby signalling that the filtering device needs servicing. After the apparatus with which the filtering device is associated has ceased to operate, spring 46 will reseat needle valve 42 in the orifice 40 so that no further flow is permitted therethrough in either direction. Fluid, thus, will be trapped on the large area side of indicator piston 48 thereby maintaining the indicator pin in a visible position until the filtering device is serviced. Since the area of indicator piston 48 is relatively large when compared to the area of orifice 40, the indicator pin cannot be reset simply by pushing on it and, therefore, is locked in a visible position by the fluid trapped behind it until the filter bowl and contaminated filter are removed. When these are removed, the indicator pin may be returned to its hidden or non-signalling position by pulling on extension rod 56. This will open needle valve 42 thereby permitting the trapped fluid to flow through orifice 40 when the indicator pin is reset. A filter 58 may be placed around ports 52 in order to prevent entry of any particles which might prevent proper closing of the needle valve.

Although this invention has been described in connection with a specific embodiment, it will be obvious to those skilled in the art that various changes may be made in the form, structure and arrangement of parts without departing from the spirit of the invention. Accordingly, applicant does not desire to be limited to the specific embodiment disclosed herein primarily for purposes of illustration, but instead desires protection falling within the scope of the appended claim.

Having thus described the various features of the invention, what I claim as new and desire to secure by Letters Patent is:

A differential pressure indicating device for use with a filter comprising a housing having first and second bores located therein, partition means located between said bores, said partition means having an orifice for passage of fluid from one bore to the other, a needle valve member located in said first bore, said valve member being normally seated in said orifice for preventing flow therethrough, a first piston member located in said first bore and fixedly connected to said valve member for unseating said valve member, spring means for urging said valve member to its normally seated position, an indicator pin located in said second bore, a second piston member located in said second bore and fixedly connected to said indicator pin for moving same from a hidden position to a visible position, a first port for communicating one side of said first piston member with filter inlet pressure, and a second port for communicating the other side of said first piston member with filter outlet pressure, said valve member being moved to an unseated position at a predetermined differential in inlet and outlet pressures thereby permitting filter inlet pressure to communicate with said second piston member and cause movement of said indicator pin to a visible position, said valve member subsequently being returned to its seated position by said spring means when the differential pressure across said first piston member is insufficient to overcome the force of said spring means thereby hydraulically locked said indicator pin in said visible position.

References Cited in the file of this patent

UNITED STATES PATENTS

| | | |
|---|---|---|
| 1,088,817 | Graham | Mar. 3, 1914 |
| 2,263,840 | Franck | Nov. 25, 1941 |
| 2,499,494 | Greer | Mar. 7, 1950 |
| 2,536,663 | Schaer | Jan. 2, 1951 |
| 2,878,936 | Scavuzzo et al. | Mar. 24, 1959 |
| 2,979,021 | Scavuzzo | Apr. 11, 1961 |